P. B. STREICH.
DUMPING MECHANISM FOR CONVEYERS.
APPLICATION FILED SEPT. 19, 1921.

1,427,653.

Patented Aug. 29, 1922.

2 SHEETS—SHEET 1.

Inventor:
Paul B. Streich,
by Charles O. Shervey
his Atty.

P. B. STREICH.
DUMPING MECHANISM FOR CONVEYERS.
APPLICATION FILED SEPT. 19, 1921.
1,427,653.
Patented Aug. 29, 1922.
2 SHEETS—SHEET 2.
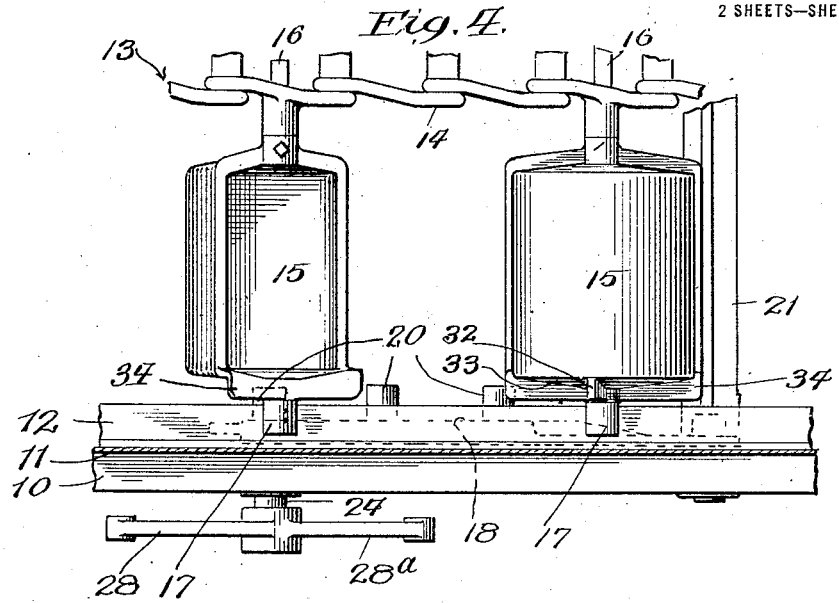
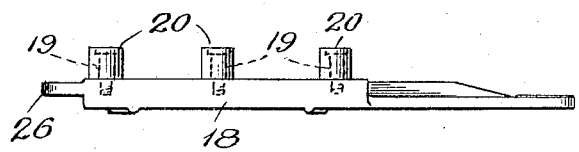
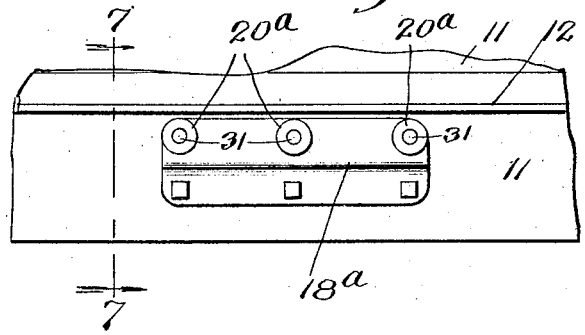
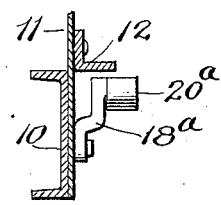
Inventor:
Paul B. Streich,
by Charles Shurvey,
his Atty.

UNITED STATES PATENT OFFICE.

PAUL B. STREICH, OF JOLIET, ILLINOIS, ASSIGNOR TO UNION MACHINERY COMPANY, OF JOLIET, ILLINOIS, A CORPORATION OF ILLINOIS.

DUMPING MECHANISM FOR CONVEYERS.

1,427,653.          Specification of Letters Patent.          Patented Aug. 29, 1922.

Application filed September 19, 1921. Serial No. 501,778.

*To all whom it may concern:*

Be it known that I, PAUL B. STREICH, a citizen of the United States, and a resident of Joliet, Will County, and State of Illinois, have invented certain new and useful Improvements in Dumping Mechanism for Conveyers, of which the following is declared to be a full, clear, and exact description.

This invention relates to dumping mechanism for conveyers, and in its present form it has been especially designed for use in connection with proofing apparatus, commonly used in bakeries where mechanical means are employed in the process of bread making. As is well understood, an endless conveyer is employed in the proofing apparatus, which conveyer is trained around pulleys or sprocket wheels in the proofing chamber to take a long circuitous path therethrough, and the conveyer is provided with buckets that receive and convey the lumps of dough from a receiving end of the chamber to a discharge end where the buckets are tilted or inverted to discharge their contents. This invention has reference to the mechanism for dumping the buckets and in accordance with one phase of the invention, the dumping mechanism is adjustable in order that it may be made active or inactive, as desired, whereby the buckets may be dumped, thereby, if desired, or may pass freely thereby without being affected.

The principal object of this invention is to provide dumping mechanism, which is simple in its construction, is effective and positive in operation, and completely inverts the buckets to insure the discharge of their contents. Another object is to provide means for jarring the buckets while in inverted position, to thereby loosen the contents therefrom, in case the contents adhere to the buckets, which frequently occurs when handling dough or other sticky plastic material. Another object is to reduce the number of parts to a minimum, to reduce friction and consequently to reduce the amount of power required to drive the conveyer.

With these and other objects and advantages in view, this invention consists in the several novel features of construction, arrangement and combination of parts hereinafter fully set forth and claimed.

The invention is clearly illustrated in the accompanying drawings, in which:—

Figure 1:
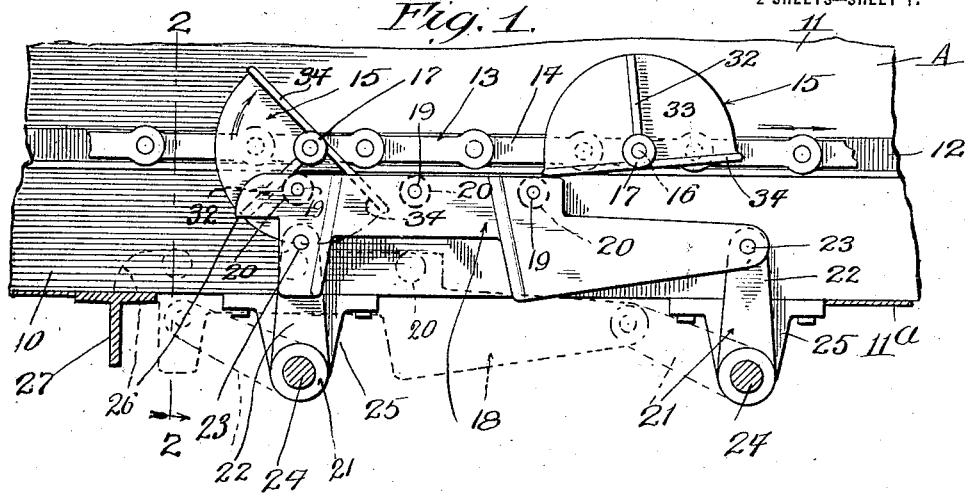
Figure 2:
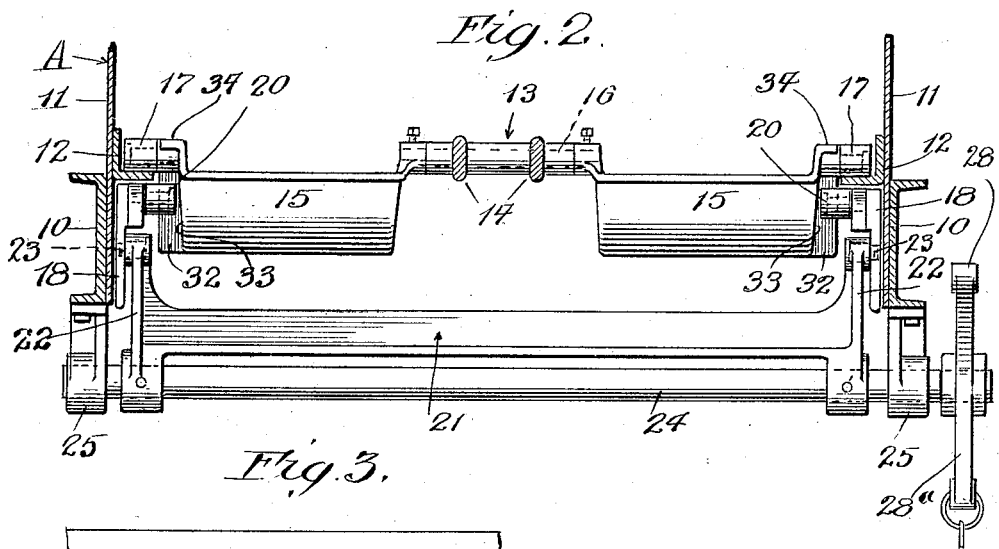
Figure 3:
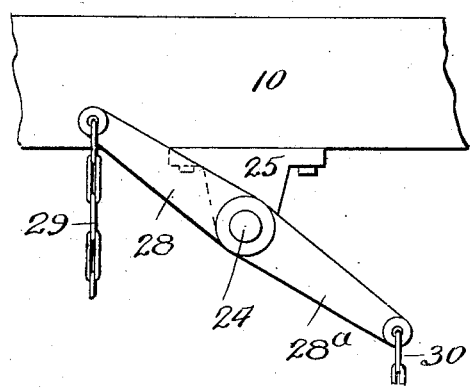

Fig. 1 is a side view of bucket dumping mechanism embodying a simple form of the present invention, one side wall of the proofing chamber being removed to show the several parts of the mechanism; Fig. 2 is a vertical, cross-section taken on line 2—2 of Fig. 1; Fig. 3 is a fragmental side elevation illustrating a certain actuating arm; Fig. 4 is a plan of the parts as seen in Fig. 1, part of the conveyer being broken away; Fig. 5 is a plan of one of the stud supporting members; Fig. 6 is a side elevation showing the application of the dumping mechanism to a permanently active one, and Fig. 7 is a cross-section taken on line 7—7 of Fig. 6.

Referring to said drawings, which illustrate a simple embodiment of the invention, the reference character A designates a fragment of the proofing chamber, which is usually in the form of an elongated box, and may comprise channel iron frame members 10, side walls 11, and a bottom 11ª, as usual. Secured on said side walls are oppositely disposed tracks 12, which support the endless conveyer 13 and the latter may comprise an endless chain or belt 14, disposed midway between the tracks 12, and carrying buckets 15, preferably arranged in pairs one of each pair being on each side of the chain or belt, and pivotally supported thereby by rods or pins 16. Journalled on the outer ends of the buckets, in axial alignment with the rods or pins 16 are rollers 17 that run on the tracks 12 and support the conveyer. The buckets are suspended so as to hang freely from the chain, and are capable of being rotated upon their supports. As a preference, they are substantially semi-cylindrical in form, although this is not material.

In accordance with one phase of the invention, the dumping mechanism includes adjustment mechanism for rendering it active or inactive, as desired, and this feature of the invention will now be described.

Along each side wall 11, below the tracks 12 is a vertically movable bucket dumping member which may take the form of a stud supporting bracket 18 which extends lengthwise of the proofing chamber, and lies close to its side wall. Journalled on studs or bolts 19 which are secured to the stud supporting bracket 18 and which extend transversely thereof into the interior of the chamber, are rollers 20, the rollers of one stud supporting bracket being disposed opposite to those of the companion one. Said rollers are arranged in horizontal alignment and are suitably spaced apart to obtain the desired result in inverting and jarring the buckets, as will be hereinafter explained.

Connecting the ends of one stud supporting bracket 18 with those of the other, are yokelike members 21, which are rotatively supported by the frame of the proofing chamber, the upper ends of the forks 22 of said yokelike members 21 being pivotally connected to the brackets 18 by pins or bolts 23, and their lower ends being mounted upon shafts 24 journalled in bearing brackets 25 secured to and projecting down from the underside of the frame members 10. The yoke like members 21 provide a parallel movement mechanism for supporting the brackets in horizontal position, both in their raised or active position or in a lowered or inactive position. One end of each bracket may be formed with a shouldered portion or lug 26, which is arranged to engage and rest upon a cross frame member 27 of the proofing chamber to thereby support the brackets in their lowered or inactive position.

Means are provided for raising and lowering the brackets 18 and in the simple form illustrated, a double rocker arm 28, 28ᵃ, is provided upon the end of one of the shafts 24, to which are attached chains or cords 29, 30, that extend down to within easy reach of an attendant. By pulling upon the chain 30 the rocker arm 28ᵃ is swung down and the shaft 24 is thereby partially rotated and the yoke-like member 21 swung upward, carrying with it the brackets 18 and other yokelike member 21. By pulling down upon the chain 29, the reverse movements of the parts take place and the brackets are thereby lowered to inactive position. The dumping mechanism just described may be placed at any point along the conveyer where it is desired to discharge the contents of the buckets before reaching the permanent dumping place.

At the permanent discharge end of the proofing chamber, a pair of stationary oppositely disposed supporting brackets 18ᵃ are bolted or otherwise secured to the side walls below the tracks 12, (see Figs. 6 and 7) and upon said brackets rollers 20ᵃ are journalled which rollers extend into the interior of the chamber on the same level or in line with the rollers 20, when the latter are in active position. The rollers 20ᵃ are arranged opposite each other, and are journalled on studs or pins 31 secured in the brackets 18ᵃ.

The buckets are each provided with members that co-act with the rollers to invert and jar the buckets and as shown, each bucket is formed with or provided with a vertical rib or flange 32, which projects out from its outer side 33 in position to engage an endmost roller 20 as the bucket passes by it. It is understood that the bodies of the buckets pass freely between the opposite rollers, and that the rollers are located below the axis of the shafts or pins upon which the buckets rotate. Each bucket is also formed with or provided with a horizontal rib or flange 34, on its outer side 33, which is arranged at right angles to the rib or flange 32 and located along the upper edge of the bucket, said rib 34 preferably extending the full length of the side of the bucket. Said horizontal rib or flange 34 is arranged to engage with the second one of the series of rollers after the vertical rib has engaged the first roller of the series, and has tilted the bucket far enough to bring the end of the horizontal rib 34 down in front of the second roller, so that as the bucket moves onward, with the chain, the horizontal rib or flange 34 encounters the second roller, while it is being held in a tilted position by the first roller, and is completely inverted by said second roller and held in such inverted position by the second and third rollers until the rib or flange 34 runs off the last one, whereupon the bucket resumes its upright or carrying position by gravity. As it passes from one roller to another, the rib or flange 34 drops after passing over a roller, since the bucket is then free to oscillate, and the rib or flange strikes against the rollers, thereby jarring the bucket, and insuring the positive discharge of its contents.

Figs. 1 and 4 show one bucket in position with its vertical rib or flange 32 in engagement with the foremost roller, and tilted to a position where one end of its horizontal rib or flange 34 is below and in front of the second roller, ready to engage it as the bucket is moved onward. Said second roller inverts the bucket and as it reaches the position shown by the bucket in advance of it, it escapes from the last roller and resumes its upright carrying position.

When it is desired to dump the buckets at the permanent dumping position, which is controlled by the bracket 18ᵃ and rollers 20ᵃ, the chain 29 is pulled down, thereby lowering the brackets 18 to inactive position, permitting the buckets to pass freely by the rollers 20.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. Dumping mechanism for swinging buckets of an endless conveyer, comprising a vertical and a horizontal rib on each bucket, a stud supporting bracket, having an active and an inactive position, and a plurality of spaced bucket engaging studs supported thereby, when in active position, in horizontal alignment with each other, and in the path of movement of said vertical ribs of the buckets, the foremost stud being spaced away from the next adjacent one sufficiently to permit the horizontal ribs of the buckets to swing down in front thereof when the vertical rib is engaged and swung out of vertical position by the foremost stud, whereby said second mentioned stud may invert the bucket when the latter is moved past it.

2. Dumping mechanism for swinging buckets of an endless conveyer, comprising a vertical and a horizontal rib on each bucket, a stud supporting bracket, a plurality of spaced bucket engaging studs supported thereby in horizontal alignment with each other, and in the path of movement of said vertical ribs of the buckets, and antifriction rollers on said studs, the foremost stud and its roller being spaced away from the next adjacent one sufficiently to permit the horizontal ribs of the buckets to swing down in front thereof when the vertical rib is engaged and swung out of vertical position by the foremost stud, whereby said second mentioned stud may invert the bucket when the latter is moved past it.

3. Dumping mechanism for swinging buckets of an endless conveyer, comprising a vertical and a horizontal rib on each bucket, a stud supporting bracket, a plurality of spaced bucket engaging studs supported thereby in horizontal alignment with each other, and in the path of movement of said vertical ribs of the buckets, the foremost stud being spaced away from the next adjacent one sufficiently to permit the horizontal ribs of the buckets to swing down in front thereof when the vertical rib is engaged and swung out of vertical position by the foremost stud, whereby said second mentioned stud may invert the bucket when the latter is moved past it, and parallel movement members pivotally connected to and supporting said stud supporting bracket and its studs in active position, said parallel movement members being capable of being swung down to move down said stud supporting bracket and therewith move its studs out of the path of movement of the vertical ribs of the buckets.

4. Dumping mechanism for swinging buckets of an endless conveyer, comprising a vertical and a horizontal rib on each bucket, a stud supporting bracket, a plurality of spaced bucket engaging studs supported thereby in horizontal alignment with each other, and in the path of movement of said vertical ribs of the buckets, the foremost stud being spaced away from the next adjacent one sufficiently to permit the horizontal ribs of the buckets to swing down in front thereof when the vertical rib is engaged and swung out of vertical position by the foremost stud, whereby said second mentioned stud may invert the bucket when the latter is moved past it, a pair of parallel movement arms pivotally connected to and supporting said stud supporting bracket and its studs in active position, and means connected with one of said arms for swinging it down to thereby move down said stud supporting bracket into an inactive position parallel with its active position, with the studs out of the path of movement of said vertical ribs of the buckets.

5. Dumping mechanism for an endless conveyer, comprising a centrally disposed bucket propelling element, and buckets along both sides thereof arranged in pairs, one on each side, and pivotally supported thereby, vertical and horizontal ribs on the outer side of each bucket, a pair of oppositely disposed stud supporting brackets, a plurality of spaced bucket engaging studs supported thereby in horizontal alignment and in the path of movement of the vertical ribs of the buckets, the studs on one stud supporting bracket being disposed opposite the studs on the other stud supporting bracket, rockable arms supporting said stud supporting brackets, and means for rocking said arms and therewith moving said stud supporting brackets and their studs to and from said active position of the studs.

6. Dumping mechanism for an endless conveyer, comprising a centrally disposed bucket propelling element, and buckets along both sides thereof arranged in pairs, one on each side, and pivotally supported thereby, vertical and horizontal ribs on the outer side of each bucket, a pair of oppositely disposed stud supporting brackets, a plurality of spaced bucket engaging studs supported thereby in horizontal alignment and in the path of movement of the vertical ribs of the buckets, the studs on one stud supporting bracket being disposed opposite the studs on the other stud supporting bracket, a pair of spaced yoke like, rockable members, each having two oppositely disposed arms each connected to a stud supporting bracket, and means for rocking one of said yokelike, rockable members, and therewith raising and lowering said stud supporting brackets into active and inactive position.

PAUL B. STREICH.